(12) United States Patent
Iida et al.

(10) Patent No.: US 6,268,083 B1
(45) Date of Patent: Jul. 31, 2001

(54) ALKALINE STORAGE BATTERY

(75) Inventors: Takuma Iida, Kamakura; Yohei Hattori; Fumihiko Yoshii, both of Fujisawa; Masato Ohnishi, Toyohashi, all of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/145,254

(22) Filed: Sep. 2, 1998

(30) Foreign Application Priority Data

Sep. 4, 1997 (JP) .................................... 9-239328

(51) Int. Cl.$^7$ .................................................. H01M 4/58
(52) U.S. Cl. ........................ 429/218.2; 429/223; 429/247
(58) Field of Search .............................. 429/218.2, 223, 429/247

(56) References Cited

U.S. PATENT DOCUMENTS 5,032,475 * 7/1991 Hasebe et al. ..................... 429/60
5,695,530 * 12/1997 Hong et al. ....................... 29/623.1
5,773,163 * 6/1998 Suzuki et al. ..................... 429/60
6,042,753 * 3/2000 Izumi et al. ....................... 429/128

FOREIGN PATENT DOCUMENTS 2215057   8/1990  (JP) .

* cited by examiner

Primary Examiner—Laura Weiner
(74) Attorney, Agent, or Firm—Stevens, Davis, Miller & Mosher, LLP

(57) ABSTRACT

The invention relates to an improvement of an alkaline storage battery and provides an alkaline storage battery excellent in high-rate discharge characteristic at low temperatures particularly by suppressing the increase of electrode resistance. The alkaline storage battery includes a positive electrode which includes a metal oxide as the main constituent material, a negative electrode which includes a hydrogen absorbing alloy, a separator, and an alkaline electrolyte, wherein the negative electrode has a capacity per unit area of 10–40 mAh/cm$^2$.

4 Claims, 1 Drawing Sheet

ALKALINE STORAGE BATTERY

BACKGROUND OF THE INVENTION

1. Field of the Invention

The present invention relates to an improvement of alkaline storage batteries, particularly to an improvement of the structure of electrode assemblies suited for high electric current discharge at low temperature.

2. Description of Related Art

In recent years, with the strong trend toward lighter-weight and smaller-sized electric appliances, there has been an increasing demand for small-sized high capacity batteries as the power source therefor. Also in alkaline storage batteries, which are batteries with high reliability, in line with the above-mentioned trend, efforts have been made to increase the capacity of nickel-cadmium storage batteries or to develop and improve nickel-metal hydride storage batteries which use as the negative electrode hydrogen absorbing alloys having a high energy density. The alkaline storage batteries of this kind have a great advantage in that since the electrolyte thereof is an alkaline electrolyte of aqueous solution type, they can be charged and discharged at large electric currents.

These batteries are generally prepared by constructing a positive electrode plate and a negative electrode plate, with a separator interposed therebetween, into a spirally coiled electrode assembly, then welding current collectors to the respective end planes of the positive electrode plate and the negative electrode plate, housing the whole in a battery case, and then pouring a predetermined amount of an aqueous alkaline solution as the electrolyte into the case.

Previous nickel-metal hydride storage batteries, as compared with nickel-cadmium storage batteries, show a marked decrease of their discharge capacity when discharged at high electric currents, particularly at low temperatures.

BRIEF SUMMARY OF THE INVENTION

The main object of the present invention is to provide an alkaline storage battery excellent in high-rate discharge characteristics at low temperatures by suppressing the decrease of the negative electrode reactivity at low temperatures, particularly by suppressing the increase of the electrode resistance.

To solve the above-mentioned problems, the present invention provides an alkaline storage battery which comprises a positive electrode comprising as the main constituent material a metal oxide, preferably nickel hydroxide, a negative electrode comprising a hydrogen absorbing alloy, an alkaline electrolyte and a separator wherein the negative electrode has a capacity per unit area of 10–40 mAh/cm$^2$.

DETAILED DESCRIPTION OF THE INVENTION

Figure 1:
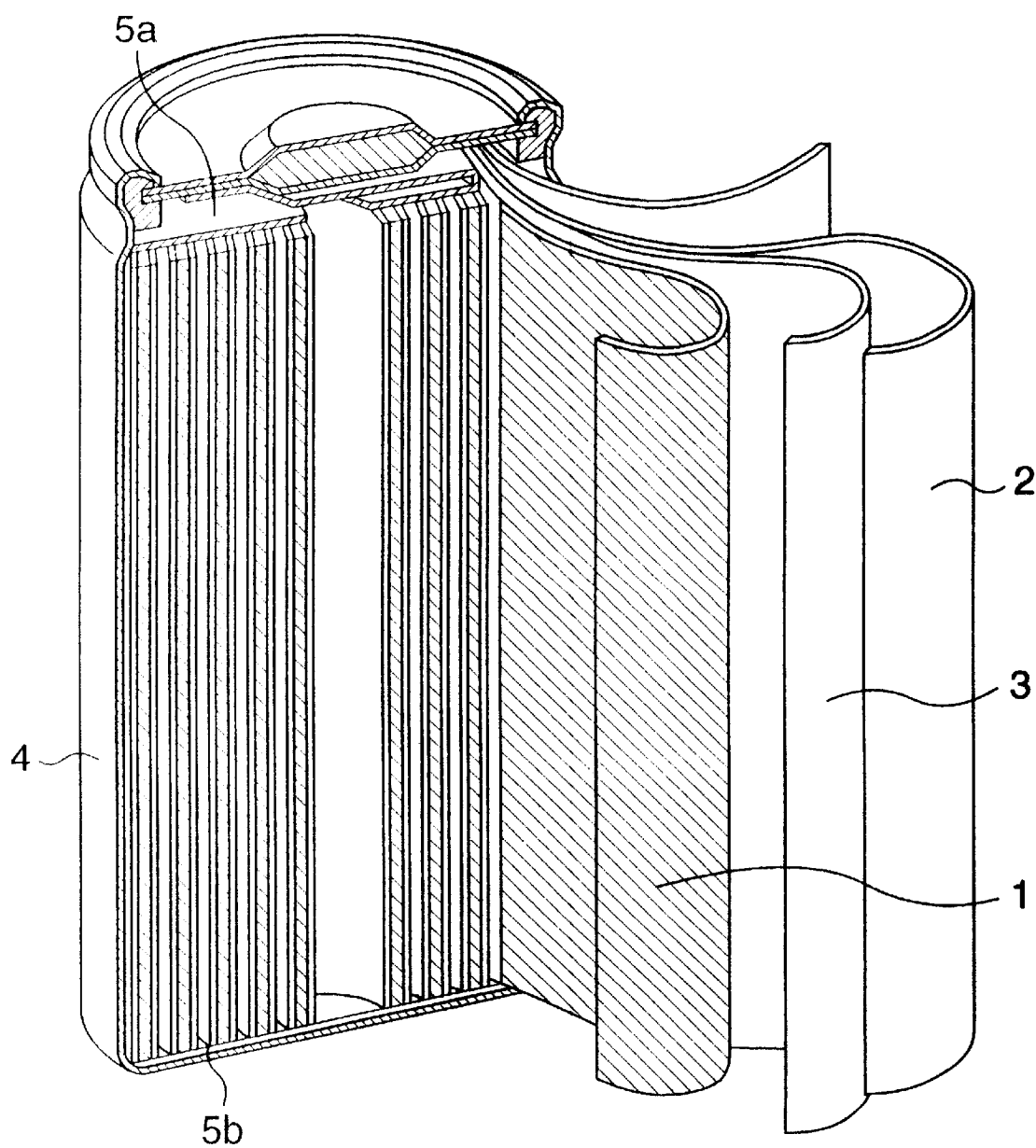
FIG. 1 is a partially sectional view of a nickel-metal hydride storage battery shown in the Example of the present invention.

A first embodiment of the present invention relates to an alkaline storage battery which comprises a positive electrode comprising a metal oxide, preferably nickel hydroxide as the main constituent material, a negative electrode comprising a hydrogen absorbing alloy, a separator and an alkaline electrolyte wherein the negative electrode has a capacity per unit area of 10–40 mAh/cm$^2$.

A second embodiment of the present invention relates to an alkaline storage battery which comprises a positive electrode comprising a metal oxide, preferably nickel hydroxide as the main constituent material, a negative electrode comprising a hydrogen absorbing alloy, a separator and an alkaline electrolyte wherein the capacity of that part of the negative electrode which is opposed to the positive electrode is at least 0.8 times the total negative electrode capacity.

A third embodiment of the present invention relates to an alkaline storage battery which comprises a positive electrode comprising a metal oxide, preferably nickel hydroxide as the main constituent material, a negative electrode comprising a hydrogen absorbing alloy, a separator and an alkaline electrolyte wherein the negative electrode has a capacity per unit area of 10–40 mAh/cm$^2$, preferably a capacity per unit length of 125–200 mAh/cm, and the capacity of that part of the negative electrode which is opposed to the positive electrode is at least 0.8 times the total negative electrode capacity.

In the above embodiments, preferably the negative electrode has a thickness of about a half of, i.e. 30% to 70% of that of the positive electrode and has a length larger than that of the positive electrode. The ratio of the length is 1.01 to 1.40.

Although the total negative electrode capacity is not limited, the capacity is preferably 3000 to 11000 mAh, the length is preferably 30 to 220 cm, the width is preferably 2.0 to 8.0 cm and the thickness is preferably 0.05 to 0.45 cm.

Although the total positive electrode capacity is not limited, the capacity is preferably 2000 to 8000 mAh, the capacity per unit area is preferably 10 to 40 mAh/cm$^2$, the capacity per unit length is preferably 80 to 200 mAh/cm, the length is preferably 40 to 200 cm, the width is preferably 2.0 to 8.0 cm and the thickness is preferably 0.1 to 0.80 mm.

The hydrogen absorbing alloy used for the negative electrode may be hydrogen absorbing alloys of rare earth metal type and those of Ti—Ni type, Ti—Mn type, Mg—Ti type, Ti—Zr type and Zr—Mn type, preferably rare earth metal type.

According to the present invention, the decrease of the negative electrode reactivity at low temperatures can be suppressed, and alkaline storage batteries which have excellent large current discharge characteristics at low temperatures can be provided.

The present invention is described in detail below. The example is not intended to limit the scope of the invention.

EXAMPLE

Example 1

The negative electrode material used was prepared by grinding a hydrogen absorbing alloy having an alloy composition of $MmNi_{3.5}Co_{0.75}Mn_{0.4}Al_{0.3}$ (Mm representing a mixture of rare earth elements) in a wet ball mill to an average particle diameter of about 30 $\mu$m.

The hydrogen absorbing alloy powder prepared above was treated in an aqueous KOH solution at 80° C. with stirring to remove soluble components from the powder surface. To 100 parts by weight of the resulting hydrogen absorbing alloy powder were added 0.15 part by weight of carboxymethyl cellulose, 0.3 part by weight of carbon black, 0.8 part by weight of a styrene-butadiene copolymer and then a suitable amount of water as a dispersant to make up a paste.

The paste was coated on both surfaces of a nickel-plated iron punched plate and dried. Then the plate was pressed at varied pressures to prepare negative electrode plates having varied negative electrode capacity per unit area. These plates were then cut into a predetermined size.

The positive electrode used was a conventional sintered nickel positive electrode, but the thickness of the positive electrode plate was selected to conform to the thickness of the negative electrode plate so that the ratio of the length of the positive electrode plate to that of the negative electrode plate may be kept unchanged. The sizes of the electrodes are shown in Table 1. A sulfonated polypropylene nonwoven fabric was used as the separator.

The positive and the negative electrode plates and the separator were made up into a spirally coiled electrode assembly such that the respective terminal edges of the positive electrode plate and the negative electrode plate project respectively upward and downward as shown in FIG. 1. Then the terminal edges of the respective electrode plates were welded to approximately circular current collectors to prepare D-size nickel-metal hydride storage batteries A, B, C and D each with a capacity of 6500 mAh. These batteries differ in the capacity of the negative electrode per unit area as shown in Table 1.

In FIG. 1, numeral 1 indicates a nickel positive electrode, 2 a hydrogen absorbing alloy negative electrode plate, 3 a separator, 4 a battery case, 5a an approximately circular positive electrode current collector and 5b an approximately circular negative electrode current collector.

The batteries A to D were used to test their discharge characteristics. In the discharge characteristic test, the battery was charged at 20° C. and at an electric current value of 0.1 CmA up to 150% of the battery capacity, allowed to stand for 1 hour, then discharged at 0° C. and at an electric current value of 1 CmA until 1.0 V, and the ratio of the discharge capacity to the battery capacity was examined. The results thus obtained are shown in Table 1.

tances such as contact resistance between active material components also increase, and resultantly the reactivity of the negative electrode decreases greatly as compared with that of conventional electrodes using cadmium.

It can be estimated that when the capacity of a hydrogen absorbing alloy negative electrode per unit area is increased, in addition to the above-mentioned decrease of the reactivity of the hydrogen absorbing alloy, the increase in the thickness of the electrode plate results in the increase of the distance between the alloy of the electrode plate surface layer and the punched metal plate positioned at the center of the thickness and serving as a current collector, and the increase of such electrode resistances as the contact resistance between alloy particles also becomes unnegligible; thus, the reactivity of the negative electrode decreases greatly, causing deterioration of discharge characteristic.

On the other hand, it can be considered that, in the batteries A, B and C, wherein the capacity of the hydrogen absorbing alloy negative electrode per unit area is 40 mAh/cm$^2$ or less, as compared with the battery C, the distance between the alloy of the electrode plate surface layer and the punched metal current collector is small and hence the increase of such electrode resistances as the contact resistance between alloy particles can be suppressed; consequently, the reactivity of the negative electrode is affected merely by the reactivity of the hydrogen absorbing alloy and resultantly the discharge characteristics are affected to a lesser extent.

Since a discharge capacity at 0° C. and at an electric current value of 1 CmA of about 70% of the battery capacity can be regarded as acceptable without problem in practice, the alloy capacity of the negative electrode per unit area is desirably not more than 40 mAh/cm$^2$.

TABLE 1

| Battery No. | Positive electrode | | | Positive electrode capacity per unit area (mAh/cm$^2$) | Negative electrode | | | Negative electrode capacity per unit area (mAh/cm$^2$) | Negative electrode/ positive electrode thickness ratio (%) | Discharge ratio (%) |
|---|---|---|---|---|---|---|---|---|---|---|
| | Width (cm) | Length (cm) | Thickness (mm) | | Width (cm) | Length (cm) | Thickness (mm) | | | |
| A | 5 | 183 | 0.17 | 7 | 5 | 200 | 0.098 | 10 | 58 | 75 |
| B | 5 | 91 | 0.34 | 14 | 5 | 100 | 0.197 | 20 | 58 | 75 |
| C | 5 | 45 | 0.68 | 28 | 5 | 50 | 0.394 | 40 | 58 | 70 |
| D | 5 | 37 | 0.86 | 35 | 5 | 40 | 0.492 | 50 | 58 | 60 |

As is apparent from the results shown in Table 1, the batteries A, B and C, which use electrode plates having a low negative electrode capacity per unit area, showed an improved discharge ratio at low temperature as compared with the battery D which uses an electrode plate having a high negative electrode capacity per unit area.

As the reason for these results, it can be considered that, though the reactivity of the negative electrode side decreases at low temperatures to a greater extent than that of the positive electrode side, the adverse influence of the negative electrode was smaller in the batteries A, B and C than in the battery D.

In general, the reactivity of an electrode is greatly influenced by the reactivity of the active material itself, and such electrode resistances as the contact resistance between respective components of the active material and the contact resistance between the active material and the carrier. Since the equilibrium pressure of a hydrogen absorbing alloy decreases at low temperatures, then its hydrogen releasing ability decreases and the reactivity of the active material decreases. Moreover, at low temperatures, electrode resis- However, decreasing the capacity of the negative electrode plate per unit area and increasing the length of the electrode plate are inevitably accompanied by the increase of the release of hydrogen from the hydrogen absorbing alloy of the negative electrode and the resultant increase in the amount of self discharge and deterioration of the self discharge characteristic. After extensive study, it has been found that the capacity of the negative electrode per unit area is desirably not less than 10 mAh/cm$^2$ in order to secure a practically acceptable self discharge characteristic.

From the results described above, the capacity of a practically useful negative electrode per unit area is desirably 10–40 mAh/cm$^2$.

As described above, the present invention, which uses a negative electrode plate having a low electrode capacity per unit area, aims at decreasing the electrode resistance and thereby improving the reaction characteristic at low temperatures, and can be applied particularly effectively to nickel-metal hydride storage batteries which use hydrogen absorbing alloys for the negative electrode.

Example 2

Investigations were made of the desirable ratio of the capacity of that part of the negative electrode which is opposed to the positive electrode, in other words, the "opposed capacity ratio" of the negative electrode. The negative electrode plates used were prepared in the same manner as in Example 1. The positive electrode plates used in combination with the negative electrode plates were of the same material as in Example 1 but were prepared by changing the size (length and width) of the sintered substrate without varying its thickness. By using these electrode plates, batteries E, F, G and H were prepared which differed in the opposed capacity ratio of the negative electrode as shown in Table 2.

The "opposed capacity ratio" of the negative electrode was calculated as the ratio of the capacity of its part which is opposed to the positive electrode to the total capacity of the negative electrode.

The batteries prepared above were subjected to the discharge characteristic test in the same manner as in Example 1. The results thus obtained are shown in Table 2.

TABLE 2

| Battery No. | Opposed capacity ratio of negative electrode | Discharge ratio (%) |
|---|---|---|
| E | 0.5 | 60 |
| F | 0.7 | 60 |
| G | 0.8 | 70 |
| H | 1.0 | 75 |

As is apparent from Table 2, the discharge characteristic of a battery improved with the increase of the ratio of the capacity of that part of the negative electrode which was opposed to the positive electrode. This is presumably because, as described above, the deterioration of low temperature discharge characteristic is caused by the decrease of reactivity of the negative electrode do a larger extent than by the decrease of reactivity of the positive electrode.

Accordingly, in order to make the hydrogen absorbing alloy in the battery contribute to charge and discharge reactions with good efficiency, it is important to raise the ratio of the capacity of that part of the negative electrode which is opposed to the positive electrode.

It is considered that in the batteries G and H, since the capacity ratio of the negative electrode part opposed to the positive electrode is high, the hydrogen absorbing alloy in the battery could be made to contribute to charge and discharge reactions with good efficiency and hence the low temperature discharge characteristic could be improved.

It can be judged from the above results that a low temperature discharge characteristic, that is, a discharge capacity at 0° C. and at an electric current value of 1 CmA is acceptable without problem in practice so long as it is not less than about 70% of the battery capacity. Accordingly, the capacity of that part of the negative electrode which is opposed to the positive electrode, in terms of its ratio to the total negative electrode capacity, is preferably 0.8 or more.

Furthermore, when the capacity ratio of the part of the negative electrode opposed to the positive electrode is at least 0.8 times the total negative electrode capacity and when, moreover, the capacity of the negative electrode per unit length is 125–200 mAh/cm and, the capacity of the negative electrode per unit area is 10–40 mAh/cm$^2$, the decrease of the negative electrode reactivity at low temperatures can be still further suppressed to give a good effect.

Though description was given in the above Examples with a nickel-metal hydride storage battery of spiral coil type as an example, similar effects can be also obtained with nickel-metal hydride storage batteries of opposed plate type, such as a rectangular one, when the battery structure of the present invention is adopted.

The positive electrode and the negative electrode used in the battery of the present invention may be any of the foamed metal type, sintered metal type and coated metal type, and the same good effects can be obtained irrespective of the type of the electrode plate used.

What is claimed is:

1. An alkaline storage battery, comprising:
    (a) a positive electrode comprising a metal oxide as the main constituent material, (b) a negative electrode comprising a hydrogen absorbing alloy, said negative electrode comprising a portion which is disposed opposite from the positive electrode, (c) a separator, and (d) an alkaline electrolyte, wherein the negative electrode has a capacity per unit area of 10–40 mAh/cm$^2$, wherein the capacity of said portion of the negative electrode which is disposed opposite from the positive electrode is 0.8–1.0 times the total negative electrode capacity and wherein the negative electrode has a thickness of about a half of that of the positive electrode.

2. An alkaline storage battery, comprising:
    (a) a positive electrode comprising a metal oxide as the main constituent material, (b) a negative electrode comprising a hydrogen absorbing alloy, said negative electrode comprising a portion which is disposed opposite from the positive electrode, (c) a separator, and (d) an alkaline electrolyte, wherein the negative electrode has a capacity per unit area of 10–40 mAh/cm$^2$, wherein the capacity of said portion of the negative electrode which is disposed opposite from the positive electrode is 0.8–1.0 times the total negative electrode capacity and wherein the negative electrode has a length larger than that of the positive electrode.

3. An alkaline storage battery, comprising:
    (a) a positive electrode comprising a metal oxide as the main constituent material, (b) a negative electrode comprising a hydrogen absorbing alloy, (c) a separator, and (d) an alkaline electrolyte, wherein the negative electrode has a capacity per unit area of 10–40 mAh/cm$^2$ and wherein the negative electrode has a thickness of about a half of that of the positive electrode.

4. An alkaline storage battery, comprising:
    (a) a positive electrode comprising a metal oxide as the main constituent material, (b) a negative electrode comprising a hydrogen absorbing alloy, said negative electrode comprising a portion which is disposed opposite from the positive electrode, (c) a separator, and (d) an alkaline electrolyte,
    wherein the capacity of said portion of the negative electrode which is disposed opposite from the positive electrode is at least 0.8 times the total negative electrode capacity and wherein the negative electrode has a thickness of about a half of that of the positive electrode.

* * * * *